United States Patent Office 2,966,401
Patented Dec. 27, 1960

2,966,401

HYDROCARBON GELS

Ralph W. Myerholtz, Jr., Highland, Ind., assignor to Standard Oil Company, Chicago, Ill., a corporation of Indiana No Drawing. Filed July 22, 1958, Ser. No. 750,111

16 Claims. (Cl. 44—7)

The present invention is concerned with gel compositions of a novel nature and methods by which such compositions are prepared. More particularly, the invention involves the preparation of gelled hydrocarbon liquids by means of gelation agents formed in situ by interaction of an alkali metal with a dissolved hydrocarbon elastomer such as natural or synthetic rubber.

The present invention is concerned primarily with hydrocarbon gel compositions. Gels of this general type are useful for a variety of purposes including use as incendiary fuel compositions, as solid fuels for heating, as cleaning or paint removing compositions or for use in oil well operations where formations are fractured by introducing a gelled fluid to the formation and applying pressure to the well head.

Gelled hydrocarbon liquids suitable for the aforementioned purposes are well known in the prior art. The formation of such gels, however, has usually required difficult compounding conditions. For the most part, such gels are difficult to formulate readily at ambient temperatures, particularly where it is sought to gel relatively low boiling, normally liquid hydrocarbons. Accordingly it is an object of my invention to provide a gelling agent which is effective at ambient or ordinary temperatures and which can be formed in situ in normally liquid hydrocarbons by simple mixing or stirring to produce a stable hydrocarbon gel.

A specific object of the invention is to provide a stable gelled hydrocarbon composition which can be readily resolved to a highly fluid state by simple and positive means. A further object is to provide a gelled hydrocarbon which is adhesive and sufficiently cohesive to be used as an incendiary or solid fuel composition. Yet another object is to provide a method for gelling a hydrocarbon liquid at a controlled rate so as to permit handling or pumping the hydrocarbon liquid containing the novel gelling agent prior to gelation thereof.

The foregoing and other objects of the invention are accomplished by admixing a hydrocarbon liquid with a minor amount of an unsaturated rubbery hydrocarbon-soluble polymer, preferably the copolymer of butadiene and styrene containing a major proportion of butadiene, and a dispersed alkali metal or soluble derivative thereof. I have found that dilute hydrocarbon solutions of unsaturated rubbery polymers are readily gelled when treated with finely divided alkali metal dispersions at ambient temperatures and that the resulting gel, while heat stable and cohesive, is readily resolved to a completely fluid state by contacting with agents having an active hydrogen atom or otherwise capable of reaction with alkali metals.

The rubbery polymers which serve as components of the gelling agents of the present invention include high molecular weight natural and synthetic hydrocarbon elastomers which are highly unsaturated. Such polymers include polybutadiene, polymers of substituted butadienes such as polydimethylbutadiene, poly-isoprene, copolymers of butadiene or other hydrocarbon dienes with each other or with vinyl hydrocarbons such as styrene; natural elastomers such as natural rubber which may be employed in the form of crepe, dry latex or the like; or mixtures of these or similar natural or synthetic unsaturated rubbery polymers. I prefer to employ a copolymer of butadiene and styrene containing major proportions, for example from about 50 to about 90% butadiene, such as the GR–S synthetic rubbers. The polymeric materials suitable as components of the gelling agent of my invention are unsaturated polymers characteristically containing many allylic hydrogen atoms, and it appears that such unsaturation is necessary to obtain the gelling effect herein disclosed.

The polymeric unsaturated elastomers are employed in an amount of from about 0.5 to about 5%, preferably from about 1 to about 3% by weight based on the hydrocarbon liquid to be gelled. Stock solutions of unsaturated rubbery polymers suitable for use in the present invention may be prepared containing higher percentages of dissolved polymer and added to the hydrocarbon to be gelled in order to achieve the desired concentration of polymer within the indicated range. Such stock solutions may be prepared in the same or different hydrocarbon liquid than that which is to be gelled.

The gelling agents of the present invention are prepared by the addition of a minor amount of an alkali metal in finely dispersed form to the hydrocarbon solution of an unsaturated hydrocarbon elastomer prepared as hereinbefore described. The alkali metal is introduced into the hydrocarbon in the form of a dispersion in solvent in the form of fine particles of less than 100 microns in size, preferably about 10 to 20 microns in size. The alkali metal is usually prepared as a concentrated dispersion which may be diluted with xylene or other hydrocarbon diluent prior to actual use. On addition of the dispersed alkali metal to the hydrocarbon solution of the unsaturated elastomer and vigorous agitation thereof, for example by mechanical mixing, pumping or the like, at a temperature between ambient temperature and about 100° C., gelation of the hydrocarbon liquid ensues.

While the alkali metal, for example sodium, may be introduced in the form of a dispersion of fine particles, I have found that equally effective results can be obtained by employing a soluble alkali metal complex of which a variety are known in the art. For example, addition compounds of alkali metals and polycyclic aromatic hydrocarbons such as biphenyl, naphthalene, methyl naphthalene, acenaphthene, phenanthrene and the like may be employed in lieu of an alkali metal dispersion. Such soluble metal complexes can be prepared by reaction of the polycyclic aromatic hydrocarbon with sodium or other alkali metal in the presence of a solvent such as dimethylether or the dimethylether of ethylene glycol or of other dihydric alcohols, for example as described by N. D. Scott et al., Journal of the American Chemical Society, 58, 2442 (1936).

In the preparation of such alkali metal-hydrocarbon complexes the use of a particular solvent such as dimethylether or the dimethylether of a dihydric alcohol results in rapid reaction of the alkali metal with the polycyclic aromatic hydrocarbon. I have found that the gelling effect when employing a dispersed alkali metal, for example a sodium dispersion, for preparation of the novel gel compositions of my invention, can be enhanced and effected at lower temperatures by incorporating a minor amount of such ether solvent as a promoter in the hydrocarbon liquid to be gelled. Preferably such solvent comprises a lower alkyl di-ether of a dihydric alcohol such as ethylene glycol, diethylene glycol, polyethylene glycol or the like wherein the ether alkyl groups have from 1–4 carbon atoms each. Preferably at least one of the ether alkyl groups is methyl. The amount of ether promoter employed is generally in the range of 0.1 to 10%, preferably 1–5% by weight based on the amount of liquid hydrocarbon to be gelled.

In a further aspect of my invention, I have found that the formation of a gel by the addition of an alkali metal dispersion or alkali metal-hydrocarbon complex to a dilute solution of an unsaturated rubbery elastomer in a hydrocarbon solvent can be further enhanced by incorporation therein of a minor amount of styrene monomer. While the reason for such enhancement of the gel formation is not clearly understood, it appears that the addition of styrene monomer together with alkali metal results in the formation of an ion radical form of monomeric and/or polymeric styrene which is further stabilized by the presence of the di-ether solvent. This ion radical form of styrene is then apparently capable of reacting with the rubbery elastomer to effect an ionic linkage which resultss in gel formation. Such interaction is clearly of an ionic nature rather than a graft-type polymerization since the resulting gel is readily resolved by the addition of an agent capable of neutralizing the sodium ion, for example, by the addition of water, alcohol, free acid and the like. Generally I employ an amount of styrene monomer in the range 0.1 to 10%, preferably 1–5% by weight based on the liquid hydrocarbon to be gelled.

While the amount of alkali metal, for example sodium, either in the form of dispersed metal or metal complex is not critical, a sufficient quantity is employed to effect gelation of the hydrocarbon liquid. The amount of sodium required to produce gelation will, of course, be a function of the chemical nature of the elastomer and its concentration in the hydrocarbon liquid. Generally from about 1 to about 20 weight percent and preferably from about 5 to about 10 weight percent of alkali metal based on the dissolved elastomer is employed either as the dispersed metal or as the polynuclear aromatic hydrocarbon complex. If lesser quantities of metal are used, the solution thickens but does not gel. Greater quantities of alkali metal than indicated do not appear to be harmful.

The normally liquid hydrocarbon solvents which can be gelled according to my invention include petroleum hydrocarbons such as naphthas, gasoline, kerosene, fuel oil distillates and the like, pure hydrocarbons such as benzene, toluene, xylene, cyclohexane and the like, and higher boiling hydrocarbon fractions which contain substantial proportions of relatively low boiling hydrocarbons, for example mixtures of crude oils containing lighter petroleum fractions. The hydrocarbon liquids which are to be gelled should be free of materials which will react with sodium or other alkali metals, for example they should be substantially dry. In the event that some water is present in the dissolved state, it has been found that larger quantities of sodium, either in dispersed or complex form are required for the formation of the desired gel. In this event, the initial quantities of sodium which are added to the solvent react with any moisture present and thus in effect act as a purifying and drying agent. Further addition of sodium results in the formation of the desired gel despite the presence of traces of sodium hydroxide which apparently has no deleterious effect.

The gels formed as described herein are stable to heat but can be readily broken when it is desired to convert the gel to a low viscosity free-flowing liquid. Resolution of the gel can be accomplished readily by contacting with an agent having active hydrogen or otherwise capable of reacting with elemental sodium. If the gel is merely brought into contact with water the gel will break slowly, for example, in from about 2 to about 15 hours because of the immiscibility of water with the gelled hydrocarbon phase. Much more rapid resolution of the hydrocarbon gels of my invention can be obtained by contacting them with a hydrocarbon-miscible agent capable of reacting with sodium, for example a lower aliphatic carboxylic acid. Acetic acid is especially effective for this purpose, resulting in immediate resolution of the gels to completely fluid form. Controlled rates of resolutions of the gels can readily be obtained by employing aqueous solutions of acetic acid or other carboxylic acids, for example aqueous solutions containing from 10 to about 90% acetic acid. Equally effective for resolution of the hydrocarbon gel are lower aliphatic alcohols such as methanol, ethanol and the like, and these too can be employed in the form of aqueous solutions to effectively control the rate of disintegration of the hydrocarbon gel. Gaseous carbon dioxide or carbon dioxide containing minor amounts of water may be contacted with the gel to effect ready resolution thereof.

The following specific examples further illustrate methods of carrying the present invention into practice. It will be understood however that the invention may be carried out by the use of other chemicals, as are set forth in this specification, than those specifically mentioned in the examples.

*Example 1*

To 50 ml. of a 2% by weight solution of GR–S No. 1006 in benzene was added 50–60 mg. of dispersed sodium (as a 50% by weight disperson in xylene-average particle size 10–20 microns). No gelation occurred for 10–15 minutes at room temperature. The mixture was then warmed to 46–48° C. A yellow color developed and gelation occurred rapidly. The gelled hydrocarbon was self-supporting and cohesive and did not readily flow.

*Example 2*

Example 1 was repeated, except that 1.0 ml. of styrene monomer was added to the GR–S solution prior to the sodium addition. No gelation occurred at ambient temperature for 10–15 minutes. The mixture was then warmed to 30° C. and gelation occurred rapidly.

*Example 3*

A 1% solution of GR–S No. 1006 in benzene was treated with 120 mg. of sodium as the sodium biphenyl. Upon addition of the complex to the rubber solution gelation occurred rapidly at room temperature.

*Example 4*

20 ml. of a 2% by weight solution of GR–S No. 1006 in benzene was prepared containing 2 ml. of 1,2-dimethoxyethane and 0.25 ml. of styrene monomer. To this was added 20–40 mg. of sodium as a 50% dispersion in xylene. Gelation occurred rapidly at room temperature. In a repeat experiment it was found that combining the GR–S solution, sodium and styrene at room temperature did not produce gelation. However, as soon as the 1,2-dimethoxyethane was added, gelation rapidly occurred.

*Example 5*

17 gm. of a 12% xylene solution of GR–S No. 1006 was added to 83 gms. of cyclohexane. Then 2 ml. of diethylene glycol dimethylether and 0.5 ml. of styrene monomer were added to 25 ml. of the rubber solution. Addition of dispersed sodium at room temperature resulted in initial gas evolution due to traces of moisture in the solvent. After gas evolution ceased, further addition of dispersed sodium caused the solution to gel.

*Example 6*

Example 5 was repeated employing gasoline (i.e. a commercial mixture of hydrocarbons predominantly comprising heptane) in place of cyclohexane. Initial addition of sodium dispersion resulted in gas evolution, after which further addition of sodium resulted in the solution becoming extremely viscous.

*Example 7*

Separate samples of the gels prepared in Examples 1-6 are treated with water, methanol and acetic acid. The addition of water requires vigorous agitation and prolonged treatment to effect resolution of the gel. Treatment of the gels with methanol or acetic acid results in immediate resolution of the gel to a highly fluid liquid state.

In a similar manner, gels are prepared by dissolving 1-5% butadiene or natural rubber in anhydrous hydrocarbon solvents and effecting gelation thereof by addition of dispersed sodium or sodium in the presence of minor amounts of monomeric styrene and/or 1,2-dimethoxyethane or other ether promoter as hereinbefore described. An attempt was made to effect gelation by similarly treating a solution of butyl rubber in benzene. No gelation occurred.

While GR-S No. 1006 was employed as the unsaturated hydrocarbon elastomer in the above examples, other butadiene-styrene copolymers may be used with equally effective results. Thus butadiene polymer or any unsaturated rubbery elastomer containing 50-90% butadiene copolymerized with styrene can be employed as a component of the gelled composition of the present invention. In several examples, the GRS-1006 employed was first purified by solution in benzene or xylene, filtration and precipitation of the polymer by addition of methanol. No difference in gel-forming properties was noted.

It will be apparent from the foregoing examples that hydrocarbon gels can be simply and effectively prepared from a variety of hydrocarbon liquids by the process of the present invention. By proper adjustment of temperature, ratio of reactants and order of addition of the components of the gelling agent, gelation can be effected immediately or after a readily controlled period of time. This effect is particularly important where it is desired to incorporate other materials, for example fracture supports such as sand, in the hydrocarbon fluid prior to pumping into position in a hydrofracturing operation.

While the gels prepared by the method of the present invention can be resolved by contact with water, for example after extended periods of time in contact with connate water present in oil bearing formations, the gels are readily broken by treatment with cheap and readily available chemical agents such as lower alkanols or lower aliphatic carboxylic acids. Flushing and removal of the gel from underground formation therefore presents no problem, and formations which are treated with these gels can be quickly put back into oil producing operation.

Gels produced according to my invention may be used as solid fuels and lubricants, as military incendiaries, as hydraulic fluids or for other uses known to the art. In employing these gels, for example as hydraulic fracturing agents in wells to promote oil production, solid fracture propping agents may be incorporated in the gelled fluid so that once a fracture is formed in the formation, its closing is prevented by the propping agent deposited in a channel which is permeable to the well fluid. Suitable propping agents are materials such as plaster, sand or other finely divided materials having a particle size of about 16 mesh; between about 0.5 and about 10 pounds of such propping agent can be added to each gallon of viscous gel. Such propping agents are preferably dried prior to use to avoid excessive and uneconomical use of sodium in the preparation of the gelled hydrocarbon.

The compositions disclosed herein may be used in many different ways such as in combination with any suitable means for igniting combustible materials. Incendiary gels of the present invention may be used for various gel purposes as in "canned heat" compositions and the like. Broadly considered, the invention provides gels made from hydrocarbons generally and provides gelatinous compositions having diverse utility well known in the art.

Variations from and modifications of the examples of the invention, above set forth, will occur to the expert without, however, unduly departing from the spirit of my invention. Such variations and modifications are therefore to be deemed within the scope of the invention, except as do not come within the scope of the appended claims.

I claim:

1. A method for gelling a normally liquid hydrocarbon which comprises adding to said liquid from about 0.5 to about 5% by weight of an unsaturated hydrocarbon polymer and a gel-forming amount of a member of the class consisting of dispersed alkali metals and hydrocarbon soluble complexes of alkali metals and polynuclear aromatic hydrocarbons and stirring the resultant mixture at a temperature between ambient temperature and about 100° C. until a gel of the desired characteristics is obtained.

2. A method for gelling a normally liquid hydrocarbon which comprises adding to said liquid from about 1 to about 3% by weight of an unsaturated hydrocarbon polymer and a gel-forming amount between about 1 and about 20% by weight based on said polymer of a finely dispersed alkali metal and stirring the resultant mixture at a temperature between ambient temperature and about 100° C. until a gel of the desired characteristics is obtained.

3. The method of claim 2 wherein said liquid hydrocarbon contains from about 0.1 to about 10% by weight based on said liquid of a dimethylether of a dihydric alcohol.

4. The method of claim 2 wherein said liquid hydrocarbon contains from about 0.1 to about 10% by weight based on said liquid hydrocarbon of monomeric styrene.

5. A method for gelling a normally liquid hydrocarbon which comprises adding to said liquid from about 1 to about 3% by weight of a copolymer of butadiene and styrene containing a major proportion of butadiene, between about 1 and about 20% by weight of dispersed sodium based on the weight of said copolymer and a promotional amount of between about 0 and 10% of a member of the group consisting of styrene, dimethylether of a dihydric alcohol and mixtures thereof and stirring the resultant mixture at ambient temperature until a gel is obtained.

6. The method of claim 5 wherein said dimethylether is the dimethylether of ethylene glycol.

7. The method of claim 5 wherein said dimethylether is the dimethylether of diethylene glycol.

8. A method for gelling a normally liquid hydrocarbon which comprises adding to said liquid from about 1 to about 3% by weight of an unsaturated hydrocarbon polymer and a gel-forming amount of a hydrocarbon soluble complex of an alkali metal and a polynuclear aromatic hydrocarbon and stirring the resultant mixture at ambient temperature until a gel of the desired characteristics is formed.

9. The process of claim 8 wherein said alkali metal complex is a sodium complex of biphenyl.

10. A gelled hydrocarbon consisting essentially of a normally liquid hydrocarbon and between about 0.5 and about 5 weight percent based on said liquid of an unsaturated hydrocarbon polymer and between about 1 and 20 weight percent based on the weight of said polymer of an alkali metal said alkali metal being present in the form of fine particles of less than 100 micron size.

11. A gelled hydrocarbon consisting essentially of a normally liquid hydrocarbon and between about 0.5 and about 5 weight percent based on said liquid of an unsaturated hydrocarbon polymer and between about 1 and 20 weight percent based on the weight of said polymer of an alkali metal said alkali metal being present in the form of fine particles of less than 100 micron size and a promotional amount between 0.1 and 10% by weight based on said liquid of a member of the class consisting of styrene, dimethylether of a dihydric alcohol and mixtures thereof.

12. The gelled hydrocarbon of claim 11 wherein said alkali metal is sodium.

13. The gelled hydrocarbon of claim 11 wherein the liquid hydrocarbon is gasoline.

14. The gelled hydrocarbon of claim 11 wherein the unsaturated hydrocarbon polymer is a copolymer of butadiene and styrene comprising from about 50 to about 90% butadiene.

15. A gelled hydrocarbon consisting essentially at a normally liquid hydrocarbon and between about 0.5 and about 5 weight percent based on said liquid of an unsaturated hydrocarbon polymer and between about 1 and 20 weight percent based on the weight of said polymer of an alkali metal, said alkali metal being present in the form of a soluble complex of a polynuclear aromatic hydrocarbon.

16. The gelled hydrocarbon of claim 15 wherein said complex is a sodium-biphenyl complex.

References Cited in the file of this patent

UNITED STATES PATENTS

| | | |
|---|---|---|
| 2,530,493 | Van Loenen | Nov. 21, 1950 |
| 2,801,967 | Wilson | Aug. 6, 1957 |

FOREIGN PATENTS

| | | |
|---|---|---|
| 343,548 | Great Britain | Feb. 16, 1931 |

OTHER REFERENCES

J. of Physics and Colloid Chem., article by Rueggeberg, vol. 152, 1948, pp. 1444–1446.

J. of Amer. Chem. Soc., vol. 58 (1936), p. 2442.